US011951667B2

(12) United States Patent
MacQuarrie

(10) Patent No.: US 11,951,667 B2
(45) Date of Patent: Apr. 9, 2024

(54) EXTRUDED TUBULAR FILMS AND PROCESSES FOR MANUFACTURING TUBULAR FILMS

(71) Applicant: Reg MacQuarrie, Ontario (CA)

(72) Inventor: Reg MacQuarrie, Ontario (CA)

( * ) Notice: Subject to any disclaimer, the term of this patent is extended or adjusted under 35 U.S.C. 154(b) by 82 days.

(21) Appl. No.: 17/603,643

(22) PCT Filed: Apr. 16, 2020

(86) PCT No.: PCT/CA2020/050511
§ 371 (c)(1),
(2) Date: Oct. 14, 2021

(87) PCT Pub. No.: WO2020/210911
PCT Pub. Date: Oct. 22, 2020

(65) Prior Publication Data
US 2022/0212390 A1    Jul. 7, 2022

Related U.S. Application Data

(60) Provisional application No. 62/834,736, filed on Apr. 16, 2019.

(51) Int. Cl.
| B29C 48/10 | (2019.01) |
| A22C 13/00 | (2006.01) |
| A23J 3/14 | (2006.01) |
| A23P 30/20 | (2016.01) |
| B29C 48/00 | (2019.01) |
| B29C 48/88 | (2019.01) |
| B29C 48/885 | (2019.01) |
| B29K 105/00 | (2006.01) |
| B29L 23/00 | (2006.01) |

(52) U.S. Cl.
CPC .......... *B29C 48/10* (2019.02); *A22C 13/0016* (2013.01); *A23J 3/14* (2013.01); *A23P 30/20* (2016.08); *B29C 48/022* (2019.02); *B29C 48/885* (2019.02); *B29C 48/913* (2019.02); B29K 2003/00 (2013.01); B29K 2105/0038 (2013.01); B29K 2105/0088 (2013.01); B29K 2105/258 (2013.01); B29K 2995/0056 (2013.01); B29K 2995/0088 (2013.01); B29L 2023/002 (2013.01)

(58) Field of Classification Search
None
See application file for complete search history.

(56) References Cited

U.S. PATENT DOCUMENTS

| 6,323,265 B1 | 11/2001 | Bengs et al. |
| 6,730,340 B1 | 5/2004 | MacQuarrie |
| 6,902,783 B1 | 6/2005 | Hammer et al. |
| 2007/0182058 A1 | 8/2007 | Chen et al. |
| 2009/0280221 A1 | 11/2009 | MacQuarrie |

FOREIGN PATENT DOCUMENTS

| CA | 3049329 A1 | 2/2020 |
| CA | 3049330 A1 | 2/2020 |
| WO | 2019141664 A1 | 7/2019 |

OTHER PUBLICATIONS

Canadian Intellectual Property Office, International Search Report and Written Opinion in Application No. PCT/CA2020/050511, dated Jul. 2, 2020, 8 pages, Quebec, Canada.
Suryanti et al., "Physicochemical Properties of Dietary Fibers from *Artocarpus camansi* Fruit", International Conference on Food Science and Engineering 2016, IOP Conf. Series: Materials Science and Engineering 193 (2017) 012012, IOP Publishing, doi: 10.1088/1757-899X/193/1/012012.
Ronie et al., "Characterisation of Bario Rice Flour Varieties: Nutritional Compositions and Physicochemical Properties", https://www.mdpi.com/journal/applsci, Appl. Sci. 2022, 12, 9064, https://doi.org/10.3390/app12189064.
Chandra et al., "Assessment of functional properties of different flours", African Journal of Agricultural Research, Academic Journals, vol. 8, Issue 38, Oct. 3, 2013, pp. 4849-4852, ISSN 1991-637X, http://www.academicjournals.org/AJAR, doi:10.5897/AJAR2013.6905.
Sindhu et al., "Physicochemical and Functional Properties of Starch and Flour of Tartary Buckwheat (*F. tataricum*) Grains", International Journal of Engineering Research & Technology (IJERT), vol. 5, Issue 06, Jun. 2016, ISSN 2278-0181, http://www.ijert.org.
Köhn et al., "Assessment of different methods for determining the capacity of water absorption of ingredients and additives used in the meat industry", International Food Research Journal, vol. 22, Issue 1, 2015, pp. 356-362, http://www.ifrj.upm.edu.my.
Odi et al., "Comparative Study on Functional Properties of Starch Extracted from Various Sources", International Journal of Current Microbiology and Applied Sciences, vol. 10, Issue 1, 2021, pp. 3612-3619, https://doi.org/10.20546/ijcmas.2021.1001.426.
Kai Kai Ma et al., "Functional Performance of Plant Proteins", https://www.ncbi.nlm.nih.gov/pmc/articles/PMC8871229/, Published online Feb. 18, 2022, doi:10.3390/foods11040594.

*Primary Examiner* — Robert J Grun
(74) *Attorney, Agent, or Firm* — Marshall & Melhorn, LLC

(57) ABSTRACT

A process for manufacturing a tubular film such as an edible casing film or a packaging film. The process includes the steps of providing a preblended powder composition containing a polymer matrix, a plasticizer, and water; feeding the preblended powder composition to an extruder; heating the preblended powder composition to a temperature above 100 degrees Celsius for a sufficient time to fully hydrate the polymer matrix and to convert the powder composition to a flowable mass; and extruding the flowable mass through a tubular die of the extruder to form the tubular film. The tubular film comprises: about 40-75 wt % polymer matrix; about 10-35 wt % plasticizer; and about 10-35 wt % water. The polymer matrix component is fully hydrated under the temperature, pressure and shear conditions inside the extruder, and may have a component which is only fully hydrated at temperatures above about 100 degrees Celsius.

20 Claims, No Drawings

EXTRUDED TUBULAR FILMS AND PROCESSES FOR MANUFACTURING TUBULAR FILMS

CROSS-REFERENCE TO RELATED APPLICATION

This application claims priority to and the benefit of U.S. Provisional Patent Application No. 62/834,736 filed Apr. 16, 2019, the contents of which are incorporated herein by reference.

TECHNICAL FIELD

This disclosure relates to tubular films, such as edible casing films for meat products, such as tubular casings for sausages and other meat products, as well as packaging films. In particular, the disclosure relates to processes for manufacturing tubular films comprising edible vegetable casing film compositions by extrusion, and to extruded tubular films comprising such compositions.

BACKGROUND

Edible films have been used for a number of years to replace membranes and casings made of animal viscera, for example in the production of meat products such as ham and sausages. As described in U.S. Pat. No. 6,730,340 by MacQuarrie et al., such edible films are commonly comprised of collagen, modified cellulose and carrageenan.

Tubular collagen films are typically manufactured by extrusion, however, because collagen is typically derived from animal sources, collagen may be an unacceptable casing or film material for religious and dietary reasons.

As described in Publication No. US 2009/0280221 A1 by MacQuarrie, tubular vegetable-based casing films can be difficult to prepare on a commercial scale using standard production technologies such as extrusion into tubular form, followed by shirring (longitudinally gathering) the tubular casing film.

For example, many vegetable-based casings take advantage of the well known film-forming abilities of starches and gums. However, most gums and starches used for forming films are readily water soluble and do not exhibit sufficient phenoplastic properties to allow the production of a homogeneous tube structure by extrusion. Therefore, these films are typically prepared by solution casting, whereby the gums/starches are slurried in water, and the slurry is cast upon a hot surface until sufficient water is removed to produce the film. The flat film must then be folded and sealed into tubular form using heat and/or adhesive.

There remains a need for tubular films such as vegetable-based casing films which are extrudable in tubular form and which provide a commercially viable alternative to collagen casing films and conventional plastic packaging films, and to processes for preparing tubular films by extrusion.

SUMMARY OF THE PRESENT DISCLOSURE

In accordance with an aspect of the present disclosure, there is provided a process for manufacturing a tubular film. The process comprises: (a) providing a preblended powder composition comprising a polymer matrix, a plasticizer, and water; (b) feeding the preblended powder composition to an extruder; (c) heating the preblended powder composition to a temperature above 100 degrees Celsius for a sufficient time to fully hydrate the polymer matrix and to convert the powder composition to a flowable mass; (d) extruding the flowable mass through a tubular die of the extruder to form the tubular film.

According to an aspect, the tubular film comprises: A. Polymer matrix in an amount of about 40-75 wt %; B. Plasticizer in an amount of about 10-35 wt %; and C. Water in an amount of about 10-35 wt %.

According to an aspect, the polymer matrix comprises one or more edible vegetable-based polymeric materials selected from the group comprising starch, flour, fibrous material, gum and vegetable protein.

According to an aspect, the polymer matrix includes a vegetable-based polymeric material which becomes fully hydrated only at temperatures above 100 degrees Celsius.

According to an aspect, the vegetable-based polymeric material which becomes fully hydrated only at temperatures above 100 degrees Celsius is a high molecular weight starch, a high amylose starch, a high molecular weight cellulose, a high molecular weight protein, or rice flour.

According to an aspect, the high molecular weight starch has a molecular weight of about 300,000 g/mol or higher.

According to an aspect, the high amylose starch has an amylose content of from about 28-75 wt %.

According to an aspect, the high amylose starch is high amylose corn starch, high amylose rice starch or high amylose pea starch.

According to an aspect, the high amylose starch is mung bean starch having an amylose content of about 23-35 wt %.

According to an aspect, the gum is selected from one or more members of the group comprising carrageenan, konjac, gellan gum, agar, guar gum, locust bean gum and xanthan gum.

According to an aspect, the vegetable protein is selected from one or more members of the group comprising soy protein, rice protein, pea protein, hemp protein, pumpkin seed protein and gluten protein.

According to an aspect, the plasticizer is selected from one or more members of the group comprising glycerin and propylene glycol.

According to an aspect, the tubular film further comprises from about 2 wt % to about 8 wt % of other components, comprising one or more members of the group comprising coloring agents, flavoring agents, antimicrobial agents and antioxidants.

According to an aspect, the tubular film comprises one continuous layer of material throughout its circumference, and does not include a longitudinal seam comprised of a heat seal or adhesive seal.

According to an aspect, the tubular film further comprises about 1-10 wt % of an edible vegetable fat or vegetable oil.

According to an aspect, the preblended powder composition is fed directly to the extruder.

According to an aspect, the preblended powder composition is converted to the flowable mass by the application of heat, pressure and shear mixing inside the extruder.

According to an aspect, the pressure inside the extruder ranges from about 25-300 bar.

According to an aspect, during the conversion of the preblended powder composition to the flowable mass, the components of the preblended powder composition, including the polymer matrix, are heated to a temperature above 100 degrees Celsius to fully hydrate the polymer matrix.

According to an aspect, the tubular film composition is cooled and dried by blowing air on the outer surface of the tubular film composition immediately downstream of the extrusion nozzle.

According to an aspect, the tubular film composition is passed through one or more annular blowers having an inner surface with a series of holes or continuous slots, through which cool or cold air is blown against the outer surface of the tubular film composition to gel solidify and dry the tubular film.

According to an aspect, the tubular film composition is inflated with air as it is extruded through the die of the extruder, and the air may contain starch or another powder ingredient to prevent the inner surfaces of the tubular film composition from sticking together when it is folded.

DETAILED DESCRIPTION OF EXEMPLARY EMBODIMENTS

The following is a description of exemplary tubular films such as edible vegetable casing film compositions or packaging films which can be extruded into tubular shapes, and to processes for their manufacture.

The film compositions are described herein with reference to a preblended powder composition and with reference to the composition of the finished tubular film. The preblended powder compositions disclosed herein may be directly fed to an extruder, and directly extruded into the form of a tubular film.

The preblended powder composition comprises a mixture of solid and liquid ingredients prior to extrusion of the tubular film. For example, the preblended powder composition may comprise the solid and liquid components (A, B, C and D) of the tubular film composition generally described below.

The finished tubular film generally comprises:

A. Polymer matrix: 40-75 wt %, for example 50-75 wt %
B. Plasticizer: 10-35 wt %
C. Water: 10-35 wt %, for example 10-20 wt %
D. Other Components: 2-8 wt %.

The polymer matrix (Component A) comprises one or more edible vegetable-based polymeric materials selected from the group comprising starches, flours, fibrous materials, gums and vegetable proteins.

Suitable starches may be selected from one or more members of the group comprising potato starch, wheat starch, tapioca starch, corn starch, rice starch, pea starch, bean starch, lentil starch, pulse starch, and like starches having have varying contents of amylose and amylopectin. The starch can be modified or unmodified.

Suitable flours may be selected from one or more members of the group comprising rice flour, wheat flour, bean flour and corn flour, with rice flour being most commonly used in the example embodiments disclosed herein.

Examples of fibrous materials include vegetable fibres such as pea fibre, rice fibre, tapioca fibre, wheat fibre and potato fibre, and may include cellulose.

Suitable gums may be selected from one or more members of the group comprising carrageenan, konjac, gellan gum, agar, guar gum, locust bean gum, xanthan gum and alginates, with carrageenan being most commonly used in the example embodiments disclosed herein.

Suitable vegetable proteins may be selected from one or more members of the group comprising soy protein, rice protein, pea protein, hemp protein, pumpkin seed protein, and like vegetable proteins.

In some embodiments, the polymer matrix comprises at least one of the above-mentioned components which only becomes fully hydrated at temperatures above 100 degrees Celsius. These components, which include certain starches, vegetable fibres and vegetable proteins, are typically considered unsuitable for solution casting processes, in which the components of the polymer matrix must be fully hydrated at temperatures below 100 degrees Celsius, typically within the range of about 75-98 degrees Celsius. The inventor has found that these components of the polymer matrix which become fully hydrated only at temperatures above 100 degrees Celsius, will become fully hydrated during extrusion and will produce higher quality extruded films with lower water sensitivities than solution casting.

On the other hand, the inventor has found that the extrusion process described herein is also compatible with combinations of ingredients which can be formed into a film by solution casting, and which include polymer matrix components which are hydrated at temperatures below 100 degrees Celsius. However, when such compositions are formed into a film by extrusion, the inventor has found that the extruded films have better strength and mechanical properties than comparable film compositions produced by solution casting, and may also require considerably less mixing time.

Although not wishing to be bound by theory, the inventor believes that the combination of heat, pressure and shear in the extruder may produce more complete hydration of the polymer matrix components (as opposed to conventional mixing and hydration in a solution casting process), and this improved or complete hydration may be at least partly responsible for the enhanced properties of the resulting film. Also, it is also somewhat counterintuitive to extrude compositions containing gums such as carrageenan, which are typically considered non-extrudable.

Therefore, the extrusion processes described herein are usable with polymer matrix components which are suitable for use in solution casting, and with polymer matrix components which were not previously considered usable in solution casting processes, either because they required higher temperature for hydration, or which were otherwise difficult to hydrate by conventional mixing.

Specific examples of polymer matrix components which become fully hydrated only at temperatures above 100 degrees Celsius include starches, vegetable fibers and vegetable proteins listed above which have higher molecular weights than similar materials used in solution casting of films. More specific examples include high molecular weight starches, high amylose starches, high molecular weight cellulose and high molecular weight proteins, including gluten proteins.

For example, high molecular weight starches which become fully hydrated (i.e. reach maximum gelation or swelling) only at temperatures above 100 degrees Celsius typically have a molecular weight of about 300,000 g/mol or higher.

High amylose starches such as high amylose corn starch which become fully hydrated only at temperatures above 100 degrees Celsius typically comprise amylose content of above about 28 wt % and up to about 75 wt %, for example within the range of about 50-75 wt %. There are, however, exceptions. Some specific starches such mung bean starch have amylose contents within the range of 23-35 wt %, but are nevertheless resistant to hydration and become fully hydrated only at temperatures above 100 degrees Celsius. For the purpose of the present disclosure, this mung bean starch having amylose contend of 23-35 wt % is considered a high amylose starch.

In some embodiments, most or all of the polymer matrix (in terms of weight) consists of polymer matrix components which become fully hydrated only at temperatures above 100 degrees Celsius.

Suitable plasticizers (Component B) may be selected from one or more members of the group comprising glycerin (also known as glycerol) and propylene glycol, with glycerin being most commonly used in the example embodiments disclosed herein. Other polyols which are generally regarded as safe (GRAS) may be used. These include erythritol, sorbitol, isomaltilol, lactitol, maltitol, polyglycitols, mannitol and xylitol.

As mentioned above, minor amounts of one or more other components (Component D) may be included in the film compositions, including one or more members of the group comprising coloring agents, flavoring agents, antimicrobial agents and antioxidants.

Coloring agents can be added to the film to produce pre-colored casings for specific applications. Suitable coloring agents include caramel and various natural and non-natural food grade colorants.

Flavoring agents can be added to impart flavor to the film and the finished product, which is defined herein as including the film and the filling or matrix. Suitable flavoring agents include both natural and artificial flavors, and include rosemary extract, oregano extract, maple flavor, sweeteners and honey.

Antimicrobial agents can be added to the film to help preserve the finished product. Suitable antimicrobial agents can be added to the initial film slurry by way of the blended polymer, water and or plasticizer. These products could include sorbates, benzoates, lactates, methyl and propyl parabens.

Antioxidants can be added to prevent the rapid oxidation of high fat-containing finished products. Suitable antimicrobial agents include both natural and artificial antioxidants, including rosemary extracts, ascorbic acid derivatives, BHA and BHT.

In addition to the ingredients mentioned above, the film composition may also include an amount of edible vegetable fat or vegetable oil, such as coconut, corn, canola, cottonseed, olive, palm, peanut, rapeseed, safflower, sesame, soy and/or sunflower oil. The vegetable fat can be added in amounts of about 1-10 wt % to provide the film with improved water resistance, slower dissolution rate, and improved oxygen barrier properties.

Exemplary film compositions are now disclosed below. All percentages disclosed below are percentages by weight of the finished film composition. It will be noted that the compositions disclosed below include only components A, B and C mentioned above, and do not include component D (other components) or vegetable fat. However, it will be appreciated that any of the following film compositions could be modified by the addition of one or more of these components mentioned above.

Example 1

The film composition according to Example 1 comprises the following:
High Amylose Rice starch 40% (fully hydrated at temperature above 100 degrees Celsius)
Carrageenan 25%
Glycerin 20%
Water 15%.
Together, the rice starch and carrageenan make up component A, the polymer matrix, and comprise 65% of the film composition. Component B, the plasticizer, comprises glycerin.

Example 2

The film composition according to Example 2 comprises the following:
High Amylose Pea starch 55% (fully hydrated at temperatures above 100 degrees Celsius)
Carrageenan 15%
Glycerin 15%
Water 15%.
Together, the pea starch and carrageenan make up component A, the polymer matrix, and comprise 70% of the film composition. Component B, the plasticizer, comprises glycerin.

Example 3

The film composition according to Example 3 comprises the following:
Rice flour 75% (fully hydrated at temperature above 100 degrees Celsius)
Glycerin 15%
Water 10%.
Component A comprises only rice flour, and does not include a gum such as carrageenan. The rice flour itself provides the necessary gel-forming activity, and may comprise a high gel rice flour or a high gel fraction thereof which is fully hydrated only at temperatures above 100 degrees Celsius. Component B, the plasticizer, comprises glycerin.

Example 4

The film composition according to Example 4 comprises the following:
Mung Bean Starch 40% (fully hydrated at temperature above 100 degrees Celsius)
Carrageenan 25%
Glycerin 20%
Water 15%.
Together, the mung bean starch and carrageenan make up component A, the polymer matrix, and comprise 65% of the film composition. Component B, the plasticizer, comprises glycerin.

The edible film compositions described above, including the exemplary compositions, are extrudable as tubular film products having the following properties:
the tubular film is transparent;
the tubular film has excellent wet strength, and higher wet strength than solution cast film products;
the tubular film exhibits uniform expansion properties;
the tubular film exhibits good adhesion to the matrix it is stuffed with;
the tubular film does not discolor during normal cooking processes, such as frying, baking and broiling;
the tubular film can be successfully extruded without the addition of any allergens or animal-based compounds;
the tubular film is produced with compounds that are generally recognized as safe (GRAS);
the tubular film is bacteriologically inert and with low water activity to allow for long shelf stability; and
the tubular film is stable in refrigerated and frozen conditions.

In addition, the tubular film comprises one continuous layer of material throughout its circumference, and does not include a longitudinal seam comprised of a heat seal or adhesive seal.

The following is a description of the process for producing the tubular film products as described above by extrusion, using a single screw, twin screw and multi-screw extrusion system.

A free-flowing, preblended powder composition is formed by blending together the solid and liquid ingredients of the composition in the required ratios disclosed above, including some or all of the plasticizer and some or all of the water.

The preblended powder composition is then fed directly to the extruder. Depending on the composition and the extrusion setup, the preblended powder composition can be directly extruded into the form of a tubular casing film. Alternatively, the powder composition may be extruded into an intermediate product such as pre-compounded pellets which will later be extruded into a tubular casing film, with the optional addition of amounts of liquid components (e.g. plasticizer and/or water) in various zones of the extruder.

The screw configuration of the extruder is set up to allow for maximal mixing under low shear. Inside the extruder the preblended powder composition is converted into a flowable mass by the application of heat and pressure inside the extruder. For example, the extrusion profile can be configured with zone heating ranging from about 30-200 degrees Celsius and pressures ranging from 25-300 bar.

The resulting flowable liquid or gel is highly viscous, and additional water and plasticizer may be added through ports in the extruder as required for the formulation. For example, additional plasticizer may be added since the heat of extrusion may cause a portion of the plasticizer to flash off. During the conversion of the preblended powder composition to flowable liquid or gel form, the components of the polymer matrix are heated to a temperature above 100 degrees Celsius, and react with the water in the preblended powder composition, or additional water added to the extruder, to become fully hydrated. During this initial heating stage the preblended powder composition may be gradually heated to maintain the composition in the form of a flowable mass, and avoid stickiness within the mixture.

The flowable composition which is formed by melting and reacting the preblended powder composition or pre-compounded pellets is then extruded through the tubular die of the extruder to form a tubular film composition. Before extrusion the temperature of the composition may be reduced to prevent excessive release of steam from the extruder die. The tubular film may be extruded horizontally or vertically. The flowable composition may optionally be conveyed into a gear pump before extrusion so as to maintain constant pressure on the extrusion die. Also, the composition may be inflated with air as it is extruded through the die, to ensure that the tubular film composition has a uniform diameter. The inflation air may contain starch or other powder ingredient to prevent the inner surfaces of the tube from sticking together when the tube is subsequently flattened.

After extrusion, the tubular film composition is cooled and dried to provide the finished tubular film, i.e. the tubular casing. Cooling of the composition causes it to set into solid form. For example, the extrusion nozzle may be set up so that the extruded tubular film composition is immediately cooled by blowing air on the outer surface of the tubular film composition immediately downstream of the extrusion nozzle. For example, the tubular film composition may be passed through one or more annular blowers having an inner surface with a series of holes or continuous slots, through which cool or cold air is blown against the outer surface of the tubular film composition to gel (solidify) and dry the tubular film. For example, each annular blower may comprise an "air ring" or a ring-shaped "air knife". Cooling the tubular film with one or more annular blowers also reduces the water content of the tubular film to the required level, as discussed above.

Alternatively, the tubular film composition may be extruded horizontally through a number of air rings blowing hot and/or cold air onto the tube until sufficient water is removed and the tube can be collapsed and wound up, without necessarily completely cooling and setting the composition to solid form.

Although air drying is disclosed as the drying method herein, it will be appreciated that the gelled and inflated tube may instead be liquid cooled, for example by water. In one embodiment, the tube could be dropped into a cold water bath to set.

The fully dried tube is then wound up and sent to shirring. The tubes are shirred to the desired length and packaged.

The inventor has found that full hydration of the components of the polymer matrix a temperature above 100 degrees Celsius in the extruder is beneficial, as it ensures that the extrudable liquid composition has good gel-forming properties and is extrudable using standard extrusion equipment.

The inventor has found that the residence time of the preblended powder composition inside the mixing section of the extruder is sufficient to fully hydrate the components of the polymer matrix at a temperature of about 100 degrees Celsius or higher. This is somewhat surprising, given that the normal mix time in a typical batch tank (outside the extruder) is at least 45 minutes to 1 hour, while the same preblended powder composition may be mixed in the mixing section of the multi-screw extruder in less than 1 minute. The inventor attributes this reduced residence time and improved hydration to the temperature and pressure inside the extruder and to the mechanical action of the extruder screw(s).

Tubes to be used as a sausage casing are typically produced with a dry thickness range of 15 to 95 microns. Tubes are normally shirred to provide for use in handling.

While certain exemplary compositions and processes have been described herein, it will be understood that certain adaptations and modifications of the described embodiments can be made. Therefore, the embodiments described herein are considered to be illustrative and not restrictive.

What is claimed is:

1. A process for manufacturing a tubular film, comprising:
   (a) providing a preblended powder composition comprising a polymer matrix, a plasticizer, and water, wherein the preblended powder composition comprises all of the polymer matrix, all of the plasticizer, and some or all of the water which are present in the tubular film;
   (b) feeding the preblended powder composition to an extruder;
   (c) heating the preblended powder composition to a temperature above 100 degrees Celsius for a sufficient time to fully hydrate the polymer matrix and to convert the powder composition to a flowable mass;
   (d) extruding the flowable mass through a tubular die of the extruder to form the tubular film comprising:
   A. Polymer matrix in an amount of about 40-75 wt %;
   B. Plasticizer in an amount of about 10-35 wt %; and
   C. Water in an amount of about 10-35 wt %.

2. The process of claim 1, wherein the polymer matrix comprises one or more edible vegetable-based polymeric materials selected from the group consisting of starch, flour, fibrous material, gum and vegetable protein.

3. The process of claim 2, wherein the polymer matrix includes a vegetable-based polymeric material which becomes fully hydrated only at temperatures above 100 degrees Celsius.

4. The process of claim 3, wherein the vegetable-based polymeric material which becomes fully hydrated only at temperatures above 100 degrees Celsius is selected from the group consisting of a high molecular weight starch, a high amylose starch, a high molecular weight cellulose, a high molecular weight protein, and rice flour.

5. The process of claim 4, wherein the high molecular weight starch has a molecular weight of about 300,000 g/mol or higher.

6. The process of claim 5, wherein the high amylose starch is selected from the group consisting of high amylose corn starch, high amylose rice starch, high amylose pea starch and mung bean starch having an amylose content of about 23-35 wt %.

7. The process of claim 4, wherein the high amylose starch has an amylose content of from about 28-75 wt %.

8. The process of claim 2, wherein the gum is selected from one or more members of the group consisting of carrageenan, konjac, gellan gum, agar, guar gum, locust bean gum and xanthan gum.

9. The process of claim 2, wherein the vegetable protein is selected from one or more members of the group consisting of soy protein, rice protein, pea protein, hemp protein, pumpkin seed protein and gluten protein.

10. The process of claim 1, wherein the plasticizer is selected from one or more members of the group consisting of glycerin and propylene glycol.

11. The process of claim 1, further comprising from about 2 wt % to about 8 wt % of other components, comprising one or more members of the group consisting of coloring agents, flavoring agents, antimicrobial agents and antioxidants.

12. The process of claim 1, wherein the tubular film comprises one continuous layer of material throughout its circumference, and does not include a longitudinal seam comprised of a heat seal or adhesive seal.

13. The process of claim 1, wherein the tubular film further comprises about 1-10 wt % of an edible vegetable fat or vegetable oil.

14. The process of claim 1, wherein the preblended powder composition is fed directly to the extruder.

15. The process of claim 1, wherein the preblended powder composition is converted to said flowable mass by the application of heat, pressure and shear mixing inside the extruder.

16. The process of claim 15, wherein the pressure inside the extruder ranges from about 25-300 bar.

17. The process of claim 15, wherein, during the conversion of the preblended powder composition to said flowable mass, the components of the preblended powder composition, including the polymer matrix, are heated to a temperature above 100 degrees Celsius to fully hydrate the polymer matrix.

18. The process of claim 1, wherein the tubular film composition is cooled and dried by blowing air on the outer surface of the tubular film composition immediately downstream of the extrusion nozzle.

19. The process of claim 18, wherein the tubular film composition is passed through one or more annular blowers having an inner surface with a series of holes or continuous slots, through which cool or cold air is blown against the outer surface of the tubular film composition to gel solidify and dry the tubular film.

20. The process of claim 1, wherein the tubular film composition is inflated with air as it is extruded through the die of the extruder, and the air may contain starch or another powder ingredient to prevent the inner surfaces of the tubular film composition from sticking together when it is folded.

* * * * *